United States Patent
Frederiksen et al.

(10) Patent No.: US 7,957,317 B2
(45) Date of Patent: Jun. 7, 2011

(54) METHOD AND APPARATUS FOR PROVIDING CONTROL SIGNALING

(75) Inventors: Frank Frederiksen, Klarup (DK); Troels Kolding, Klarup (DK); Kari Pajukoski, Oulu (FI); Esa Tiirola, Kempele (FI); Pasi Kinnunen, Oulu (FI)

(73) Assignee: Nokia Corporation, Espoo (FI)

(*) Notice: Subject to any disclaimer, the term of this patent is extended or adjusted under 35 U.S.C. 154(b) by 218 days.

(21) Appl. No.: 12/446,213

(22) PCT Filed: Jan. 8, 2008

(86) PCT No.: PCT/IB2008/000026
§ 371 (c)(1), (2), (4) Date: Apr. 17, 2009

(87) PCT Pub. No.: WO2008/004377
PCT Pub. Date: Jul. 17, 2008

(65) Prior Publication Data
US 2010/0110878 A1    May 6, 2010

Related U.S. Application Data

(60) Provisional application No. 60/883,888, filed on Jan. 8, 2007.

(51) Int. Cl.
*G01R 31/08* (2006.01)
(52) U.S. Cl. ........ 370/252; 370/208; 370/394; 370/328; 370/537; 714/758
(58) Field of Classification Search .......................... None
See application file for complete search history.

(56) References Cited

U.S. PATENT DOCUMENTS

| | | | |
|---|---|---|---|
| 7,006,464 B1* | 2/2006 | Gopalakrishnan et al. | 370/328 |
| 7,720,504 B2* | 5/2010 | Murata et al. | 455/550.1 |
| 2002/0172208 A1* | 11/2002 | Malkamaki | 370/400 |
| 2005/0105640 A1* | 5/2005 | Han et al. | 375/295 |
| 2005/0201486 A1* | 9/2005 | Han et al. | 375/295 |
| 2010/0103882 A1* | 4/2010 | Rajkotia et al. | 370/328 |

FOREIGN PATENT DOCUMENTS

| | | |
|---|---|---|
| EP | 1 531 576 A2 | 5/2005 |
| EP | 1 564 923 A1 | 8/2005 |

OTHER PUBLICATIONS

Vietnamese Office Action for corresponding VN application No. 71436/SHTT-SC1, Dec. 2, 2009, pp. 1-2.
International Search Report and Written Opinion, PCT/IB2008/000026, Oct. 15, 2008, pp. 1-16.
Korean Office action for corresponding KR application No. 10-2009-7016539 dated Feb. 9, 2011, pp. 1-5.

* cited by examiner

*Primary Examiner* — Duc C Ho
(74) *Attorney, Agent, or Firm* — Ditthavong Mori & Steiner, P.C.

(57) ABSTRACT

An approach is provided for an efficient control signaling associated with an error control scheme. A determination is made whether data has been properly received according to an error control scheme. A first pilot sequence representing an acknowledgement is generated if the data is properly received. A second pilot sequence representing a negative acknowledgement is generated if the data is not properly received. A frame including either the first pilot sequence or the second pilot sequence is output.

15 Claims, 14 Drawing Sheets

METHOD AND APPARATUS FOR PROVIDING CONTROL SIGNALING

RELATED APPLICATIONS

This application claims the benefit of the earlier filing date under 35 U.S.C. §119(e) of U.S. Provisional Application Ser. No. 60/883,888 filed Jan. 8, 2007, entitled "Method and Apparatus For Providing Uplink Control Signaling," the entirety of which is incorporated herein by reference.

BACKGROUND

Radio communication systems, such as a wireless data networks (e.g., Third Generation Partnership Project (3GPP) Long Term Evolution (LTE) systems, spread spectrum systems (such as Code Division Multiple Access (CDMA) networks), Time Division Multiple Access (TDMA) networks, etc.), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of effort involves developing error control schemes that efficiently utilize network resources (e.g., bandwidth, processing, etc.).

SOME EXEMPLARY EMBODIMENTS

Therefore, there is a need for an approach for providing efficient control signaling, which can co-exist with already developed standards and protocols.

According to one embodiment of the invention, a method comprises determining whether data has been properly received according to an error control scheme. The method also comprises generating a first pilot sequence representing an acknowledgement if the data is properly received and generating a second pilot sequence representing a negative acknowledgement if the data is not properly received. The method also comprises outputting a frame including either the first pilot sequence or the second pilot sequence.

According to another embodiment of the invention, an apparatus comprises an error control logic configured to determine whether data has been properly received according to an error control scheme. The error control logic is further configured to generate a first pilot sequence representing an acknowledgement if the data is properly received, and to generate a second pilot sequence representing a negative acknowledgement if the data is not properly received, wherein a frame including either the first pilot sequence or the second pilot sequence is output.

According to another embodiment of the invention, a method comprises a correlating a received pilot sequence with a first pilot sequence and a second pilot sequence to determine presence of, respectively, an acknowledgement message or a negative acknowledgement message. The received pilot sequence further specifies acknowledgement signaling for transmitted data according to an error control scheme.

According to another embodiment of the invention, a channel estimator configured to correlate a received pilot sequence with a first pilot sequence and a second pilot sequence to determine presence of, respectively, an acknowledgement message or a negative acknowledgement message. The received pilot sequence further specifies acknowledgement signaling for transmitted data according to an error control scheme.

According to another embodiment of the invention, a method comprises multiplexing acknowledgement signaling bits with channel quality indicator (CQI) bits into a common sub-frame. The method further comprises a plurality of cover sequences that are applied to the acknowledgement signaling bits.

According to yet another embodiment of the invention, an apparatus comprises a multiplexer configured to multiplex acknowledgement signaling bits with channel quality indicator (CQI) bits into a common sub-frame The apparatus further comprises a plurality of cover sequences are applied to the acknowledgement signaling bits Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENTS

An apparatus, method, and software for providing control signaling in a communication network are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a wireless network compliant with the 3GPP LTE architecture with respect to the Hybrid Automatic Repeat Request (HARQ) scheme, it is recognized by one of ordinary skill in the art that the embodiments of the inventions have applicability to any type of radio communication system and equivalent error control schemes.

Figure 1:
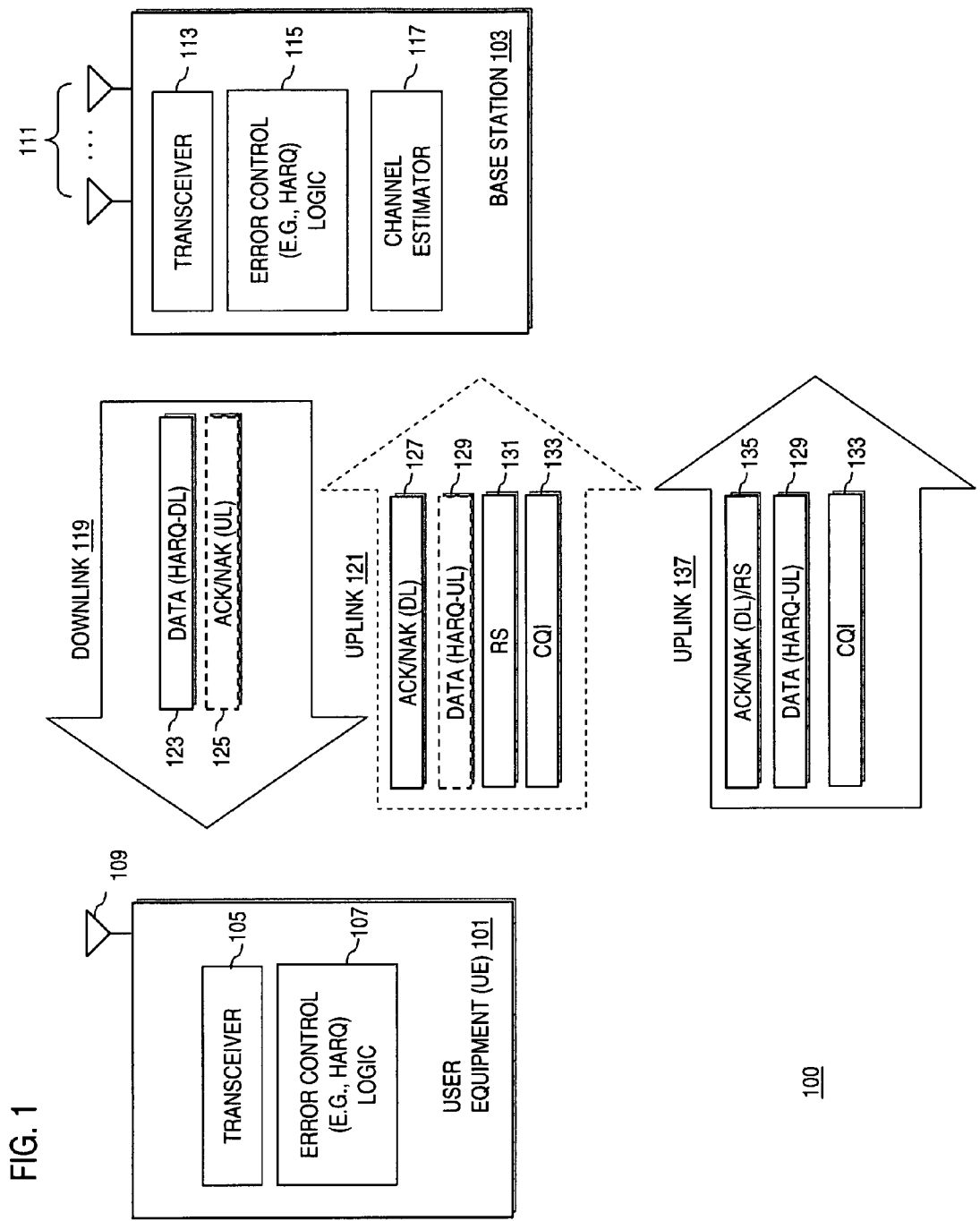
FIG. 1 is a diagram of a communication system capable of providing embedded error control information, in accordance with various embodiments of the invention.

FIG. 1 is a diagram of a communication system 100 capable of transmitting data with embedded error control information, in accordance with various embodiments of the invention. By way of example, the communication system is compliant with 3GPP LTE, entitled "Long Term Evolution of the 3GPP Radio Technology," (which is incorporated herein by reference in its entirety). As shown in FIG. 1, one or more user equipment (UEs) 101 communicate with a network equipment, such as a base station 103, which is part of an access network (e.g., WiMAX (Worldwide Interoperability for Microwave Access), 3GPP LTE (or E-UTRAN or 3.9G), etc.). Under the 3GPP LTE architecture (as shown in FIGS. 7A-7D), base station 103 is denoted as an enhanced Node B (eNB). The UE 101 can be any type of mobile stations, such as handsets, terminals, stations, units, devices, or any type of interface to the user (such as "wearable" circuitry, etc.). The base station 103, in an exemplary embodiment, uses OFDM (Orthogonal Frequency Divisional Multiplexing) as a downlink (DL) transmission scheme and a single-carrier transmission (e.g., SC-FDMA (Single Carrier-Frequency Division Multiple Access) with cyclic prefix for the uplink (UL) transmission scheme. SC-FDMA can be realized also using DFT-S-OFDM principle, which is detailed in 3GGP TR 25.814, entitled "Physical Layer Aspects for Evolved UTRA," v.1.5.0, May 2006 (which is incorporated herein by reference in its entirety). SC-FDMA, also referred to as Multi-User-SC-FDMA, allows multiple users to transmit simultaneously on different sub-bands.

The UE 101 includes a transceiver 105 and an error control logic 107 to ensure accurate exchange of data to and from the base station 103. An antenna system 109 couples to the transceiver 105 to receive or transmit signals from the base station 103; the antenna system 109 can include one or more antennas. Accordingly, the base station 103 can employ one or more antennas 111 for transmitting and receiving electromagnetic signals. As with the UE 101, the base station 103 employs a transceiver 113 and an error control logic 115, wherein the transceiver 113 transmits information over a downlink (DL) 119 to the UE 101. Additionally, the base station 103 provides a channel estimator 117 to determine the transmission characteristics of the communication channels.

One aspect of the 3GPP LTE system 100 is that a scheme referred to as Hybrid Automatic Repeat Request (HARQ) is utilized. The HARQ scheme basically combines ARQ protocols with forward-error-correction (FEC) schemes, to provide an error-control technique for wireless links. It is noted that different wireless technologies may utilize different HARQ schemes. HARQ can be used to increase the link and spectral efficiency of LTE, as HARQ allows the system to operate at a relative high block error rate of the first transmissions. The HARQ scheme can be made part of the medium access control (MAC) layer and be enabled on a terminal by terminal basis.

As such, the error control logic 107, 115 are configured to support this HARQ mechanism, according to one embodiment. With the HARQ scheme, the transmitting node essentially encodes the data to be transmitted on, for example, an uplink 121 with an appropriate error control code. If no errors are detected at the receiver, the receiving node sends a control signal commonly referred to as an acknowledgement (ACK) signal to the transmitting node, indicating the correct or proper reception of data. If, on the other hand, one or more errors are detected at the receiving node and furthermore cannot all be corrected, the receiving node sends another type of control signal referred to as a negative acknowledgement (NAK) to the transmitter requesting retransmission of the data. This process continues until the data is correctly received at the receiving node. This scheme, unfortunately, results in the utilization of valuable bandwidth due to the need to send ACK and NAK signals. That is, each time that ACK/NAK control signals are sent between the nodes, their transmissions occupy the precious bandwidth of the wireless network because traditional systems need to maintain the single-carrier properties for the transmission.

In an exemplary embodiment, the transmission on the uplink 121 may be based on regular transmission (TX) or discontinuous transmission (DTX), which may correspond to the UE 103 temporarily powering down such as during periods of silence between two parties in a cellular environment. The transmission on the uplink 121 may contain data that has been encoded according to a HARQ scheme—i.e., DATA (HARQ-UL), which may correspond to voice or Short Message Service (SMS) messages, etc. as in the case of mobile telephony. The transmission may also include control signaling to support the reliable delivery of HARQ encoded data. Control signals may include reference sequence (RS) 131 as pilot sequences and channel quality indicator (CQI) information 133. In this example, the uplink 121 may further include control signals used for positive or negative acknowledgement (denoted as ACK/NAK (DL) 127) of data received from the base station 103 on the downlink 119.

Under the scenario of FIG. 1, the downlink 119 may carry transmissions from the base station 103 sent to the UE 101 corresponding to data (i.e., DATA (HARQ-DL) 125) that has been encoded according to a HARQ scheme as well as control signals such as ACK/NAK signals (i.e., ACK/NAK (UL) 123) to acknowledge the correct or incorrect reception of data sent on the uplink 121 by UE 101. When HARQ is operating in one link direction (e.g., Uplink (UL) or Downlink (DL)), a control channel is needed in the other link direction to determine whether data packets were received and/or successfully decoded by the other end. This control channel typically carries ACK (acknowledgement) or NAK (Negative ACK) messages.

The process of generating the ACK/NAK (UL) 123 and ACK/NAK (DL) 127 carried on the uplink and downlink channels respectively may be explained by considering the case where the base station 103 sends data to the UE 101 on the downlink 119. The DATA (HARQ-DL) 125 is received by the UE 101, which then attempts to decode the encoded information (which may be in the form of a packet) on this first HARQ attempt. The UE 101 includes an embedded error control logic 107, which can implement the HARQ mechanism, according to an exemplary embodiment. If the decoding succeeds, the UE 101 sends an acknowledgement (ACK (DL) 127) to the base station 103 on the uplink 121. Otherwise, a negative acknowledgement (NAK (DL) 127) is sent to base station 103 on uplink 121. In the response to the NAK, the base station 103 sends another HARQ attempt. The base station 103 may continue to send HARQ attempts until the UE 101 successfully decodes the packet and sends an ACK or until the maximum number of retransmissions is exhausted.

According to certain embodiments, the system 100 of FIG. 1 effectively provides two pilot sequences for ACK/NACK signaling by combining the transmission of reference symbols (RS) with Hybrid Automatic Repeat request (HARQ) control information (in the case of simultaneous transmission). The system 100, in one embodiment, uses existing pilot signals of LTE uplink (UL) for conveying the ACK/NACK multiplexed with UL data, for example. It is recognized that pilot signals are needed within the system 100 for other reasons; namely, to achieve a time and/or frequency synchronization; thus, the approach does not entail additional overhead. These pilot sequences are predetermined bit streams that are known by the receiver and used by receiver channel estimators for synchronization.

As shown, the RS 131 is sent on the uplink 137 from UE 101. Receiver synchronization may be accomplished as a result of transmitting these reference symbols, RS 131. These functions may be realized by way of channel estimator 117 located within the base station 103.

The enhanced HARQ approach (as shown by the uplink 137) does not require the use of separate pilot sequences and ACK/NAK signals, but instead, employs the pilot sequences to carry ACK/NAK signaling information. In contrast to the arrangement of the uplink 121, the UE 101 need only transmit pilot signals to represent the ACK/NAK signals. Specifically, the UE 101 combines the reference symbols in the uplink with the HARQ control information for transmission to the base station 103. In this manner, two pilot sequences, one for ACK (i.e. ACK (DL)/RS 135), and the other for NAK (i.e. NAK (DL)/RS 135) are provided. According to an exemplary embodiment, the ACK signal may be transmitted as an XOR of "all ones," while the NAK can be an XOR of "alternating ones and zeros." In certain embodiments, different cyclic shifts of ZAC (Zero Automatic Correlation) or CAZAC (Constant Amplitude and Zero Automatic Correlation) can be utilized for the pilot sequences. The channel estimator 117 may then be used to determine whether a signal corresponding to an ACK or one corresponding to a NAK was transmitted. According to an exemplary embodiment, this enhanced HARQ scheme can be used to provide improved bandwidth utilization.

The uplink 137 may also contain further control information, such as channel quality indicator CQI 133. Because the UE 101 may be mobile, the characteristics of the channel may change quite rapidly; and thus, knowledge of these characteristics can assist the receiver with successful processing of the received signals. For example, the base station 103 can perform the proper resource allocation and select the appropriate modulation and/or coding schemes using the CQI information. The CQI information may be derived by measuring communication performance parameters such as signal-to-noise ratio (SNR), signal-to-interference ratio (SIR), etc. The transmitting node (e.g. a mobile phone 101) typically sends CQI information as a sequence of CQI bits to the receiving node (e.g. base station 103) which then uses these bits to make informed decisions and possibly adjusts its decoding processes accordingly. However, the transmission of redundancy in the form of CQI information, which occupies precious bandwidth. Thus, it is desirable to send CQI bits as to minimize use of network resources. The receiving node, base station 103, may hence be able to adapt to the changing conditions and utilize coding and/or modulation schemes that aid successful reception of the data, while conserving network resources. The CQI bits can be multiplexed with the acknowledgement signaling bits to streamline the control signaling, as more fully described in FIGS. 4A-4C.

The acknowledgement signaling process utilized in the uplink 137 is explained as follows.

Figure 2:
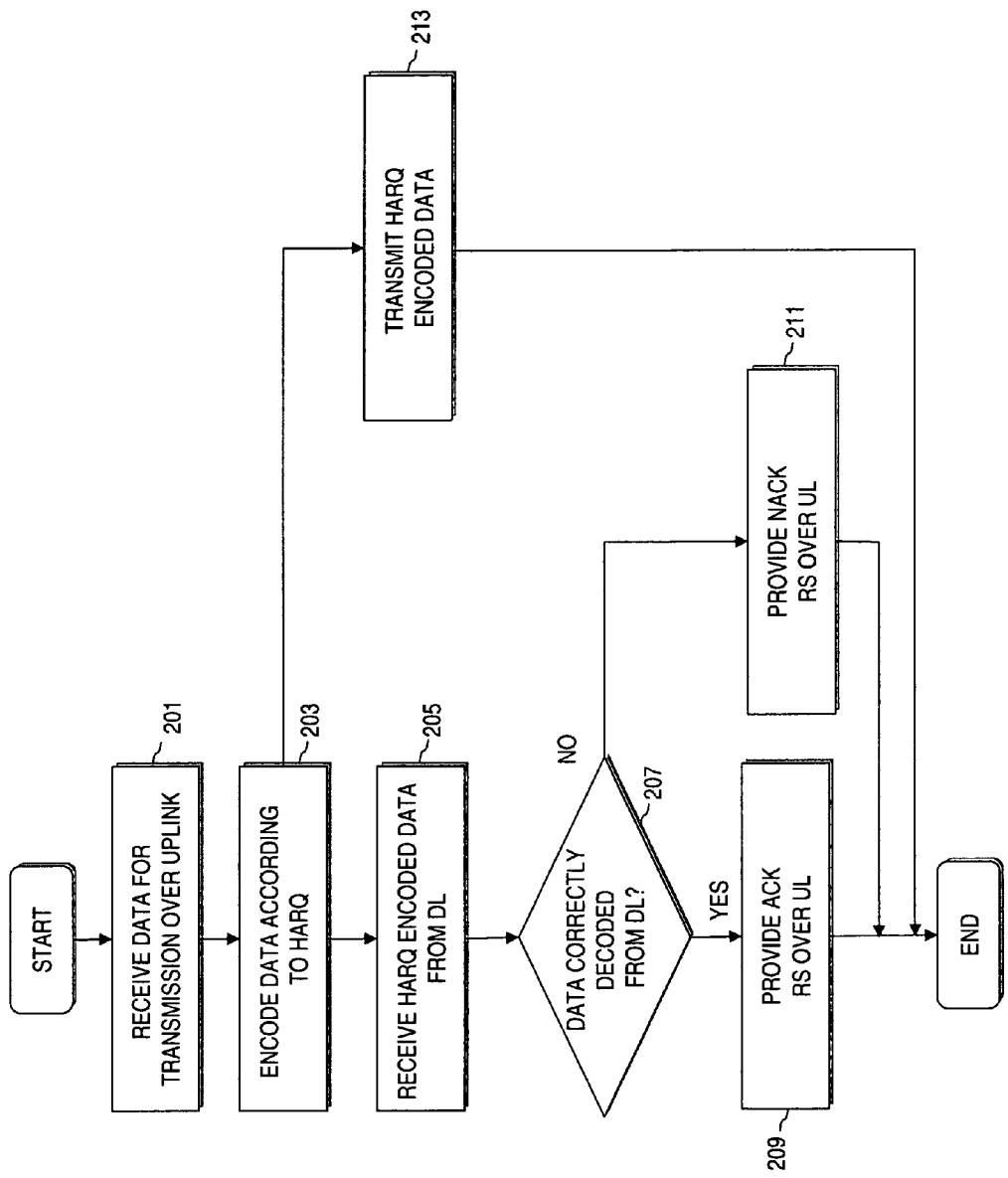
FIG. 2 is a flowchart of a process for control signaling, in accordance with an embodiment of the invention.

FIG. 2 is a flowchart of a process for control signaling, in accordance with an embodiment of the invention. In step 201, the UE 101 receives data for transmission over the uplink 137. This data is then encoded according to the HARQ scheme, as in step 203, and transmitted over the uplink (per step 213). As mentioned previously, encoding may involve the utilization of a forward error correction scheme, such as Turbo coding, block coding, or similar technique. As the uplink 137 and downlink 119 are basically disjoint entities, the UE 101 may also receive HARQ data (i.e. DATA (HARQ-DL) 125) from the downlink 119 over the control channel. This is illustrated in step 205 of FIG. 2.

Once this information is decoded, logic circuitry (e.g., error control logic 107) within UE 101 determines whether the data received from the DL was decoded correctly, as in step 207. If decoding was indeed correct, the UE 101 transmits a reference sequence ACK (DL)/RS 135 over the uplink in step 209 indicating the acknowledgement of correct data reception. If, however, correct decoding was not successful, UE 101 generates and transmits the negative acknowledgement signal, NAK (DL)/RS 135 over the uplink in step 211.

Figure 3A:
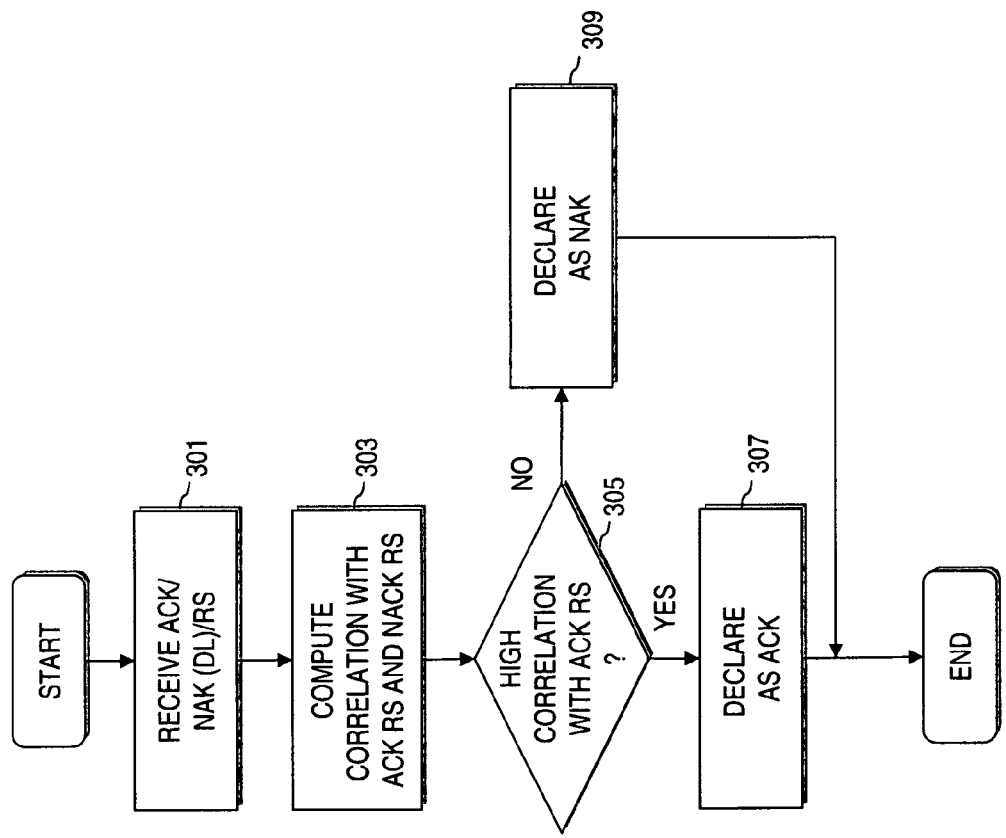
FIGS. 3A and 3B are diagrams of processes for control signaling in a single antenna environment and a multi-antenna environment, respectively, in accordance with an embodiment of the invention.
Figure 3B:
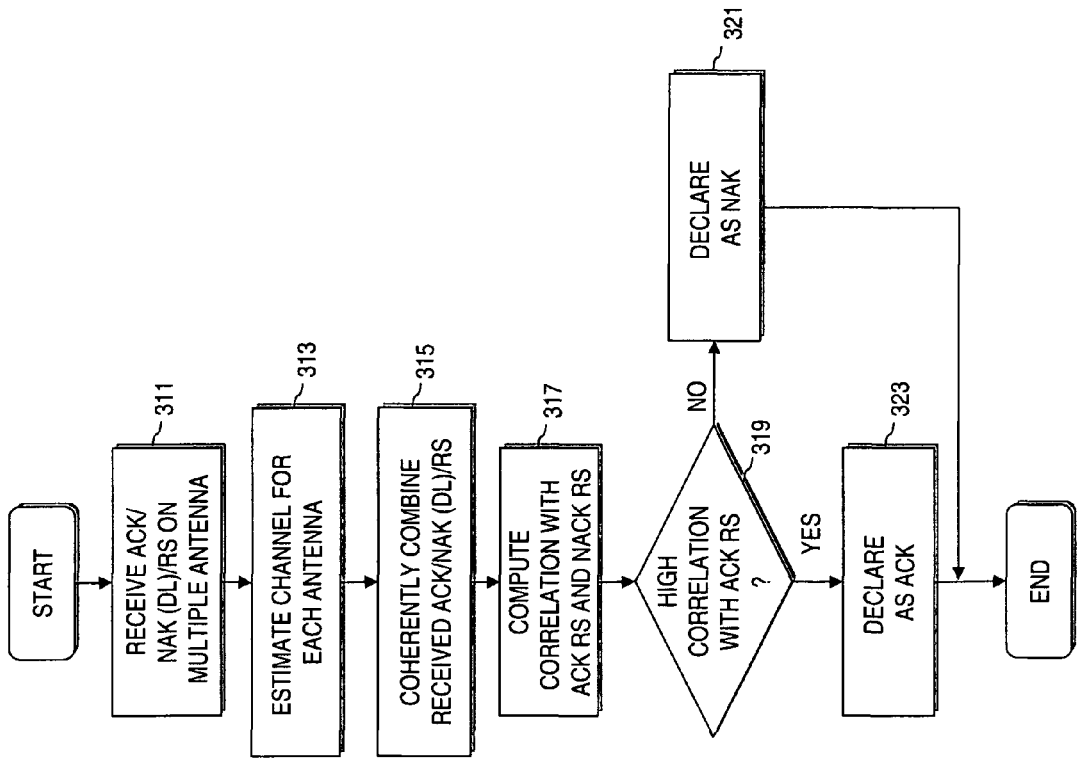

FIGS. 3A and 3B are diagrams of processes for control signaling in a single antenna environment and a multi-antenna environment, respectively, in accordance with an embodiment of the invention. After the UE 101 transmits the ACK/NAK (DL)/RS signal 135, it is received by one of the antennas 111 of the base station 103, as in step 301. The channel estimator 117 then correlates this received pilot sequence to the two known sequences for the ACK and NAK, per step 303. In an exemplary embodiment, the one sequence with the high correlation corresponds to the ACK or NAK. In step 305, the channel estimator 117 determines whether the received pilot sequence ACK/NAK (DL)/RS 135 has a high correlation with, for example, the ACK RS. If there is indeed a high correlation, the received pilot sequence is declared as ACK in step 307. If the correlation with ACK RS is poor, the received pilot sequence is declared as NAK in step 309. As an alternative, the level of correlation can be configurable, using a thresholding mechanism, for example.

In an alternative embodiment, the signal transmitted by the UE 101 may be received by multiple antennas 111 of base station 103. The multiple antenna environment may be due to cell sectoring or antenna diversity.

In a multi-antenna environment of FIG. 3B, the ACK/NAK (DL)/RS 135 pilot sequence is received (step 311). The base station 103 may utilize multiple antennas, such that the receiving process can be performed as three sub-processes: (1) tentative decision of the channel estimation for each antennas; (2) coherent combining of the received signals; and (3) combined channel estimation and ACK/NAK estimation based on the combined signal. Channel estimation for each antenna is performed by the channel estimator 117, per step 313. The ACK.NAK (DL)/RS 135 signals received by each antenna 111 are then coherently combined in step 315 and are correlated with the ACK RS and NAK RS in step 317. If the result of the correlation is high (step 319), the received sequence is declared as ACK, per step 323. If, however, the result of the correlation is low, the received sequence is declared as NAK (as is step 321).

Figure 4A:
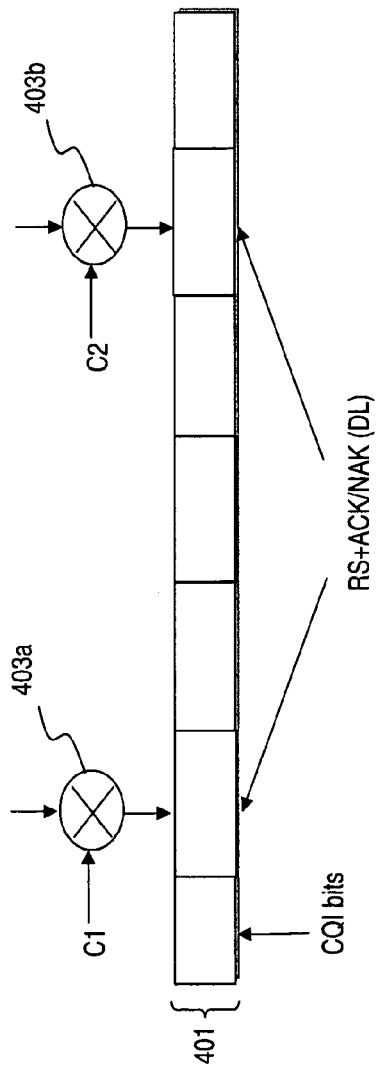
FIG. 4A-4C are diagrams of, correspondingly, different length orthogonal cover sequences and an associated multiplexing process, in accordance with various embodiments of the invention.
Figure 4B:
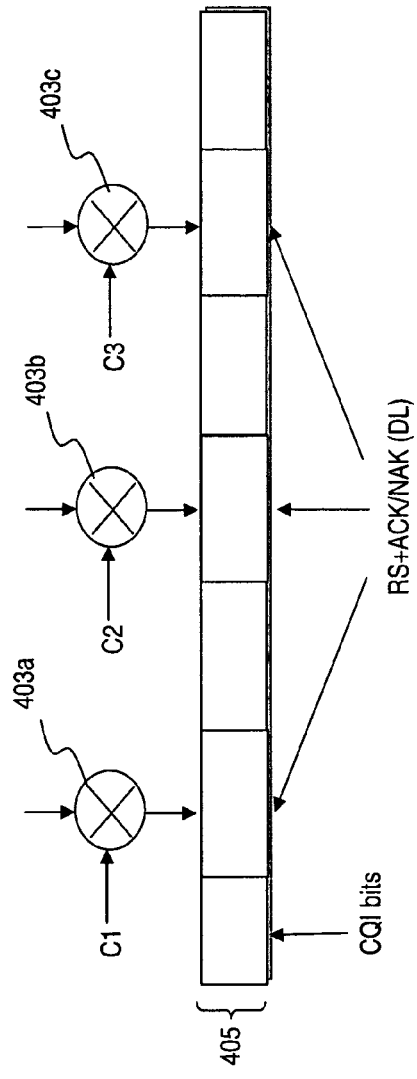
Figure 4C:
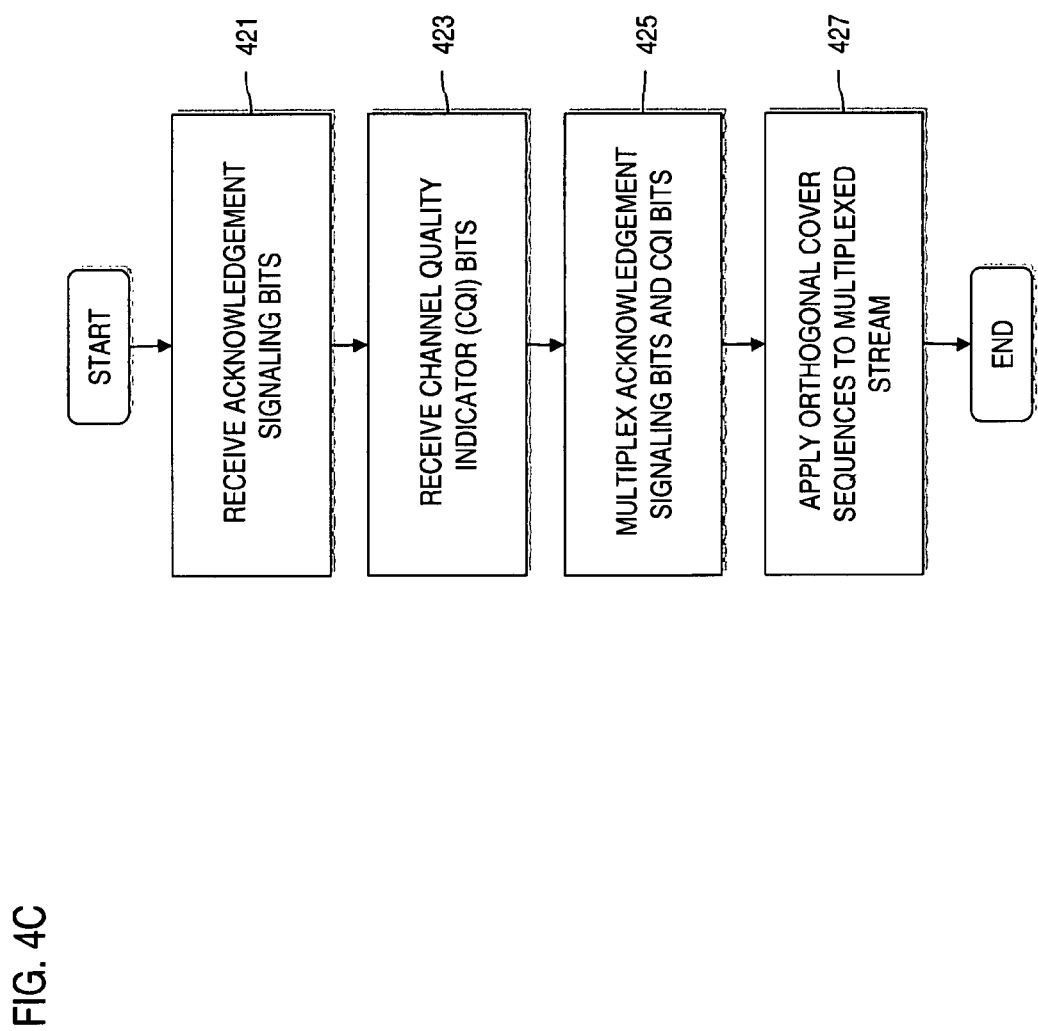

FIG. 4A-4C are diagrams of, correspondingly, different length orthogonal cover sequences and associated multiplexing process, in accordance with various embodiments of the invention. As mentioned previously, the system 100 is capable of transmitting CQI information from the UE 101 to base station 103. Two scenarios are considered: (1) transmission of the CQI bits within a packet multiplexed with the RS (i.e., pilot sequences); and (2) transmission of separate ACK/NAK sequences. In essence, the enhanced HARQ scheme of FIGS. 2-3 (representing ACK/NAK sequences using pilot sequences in the uplink 137) need not be utilized. Rather, for the purposes of illustration, the traditional HARQ scheme as used within uplink 121 is considered. It should, however, be noted that the multiplexing scheme can be utilized with the enhanced HARQ scheme of FIGS. 2 and 3.

As seen in FIG. 4A, the frame structure 401 includes two RS blocks combined with ACK/NAK bits ("RS+ACK/NACK"). Correlators 403a, 403b provide the correlation between acknowledgement signaling bits and the cover sequences, C1 and C2, respectively. Similarly, the frame structure 405 of FIG. 4B provide three RS+ACK/NACK blocks, wherein three cover sequences C1, C2, and C3 are employed through correlators 403a-403c.

Figure 5A:
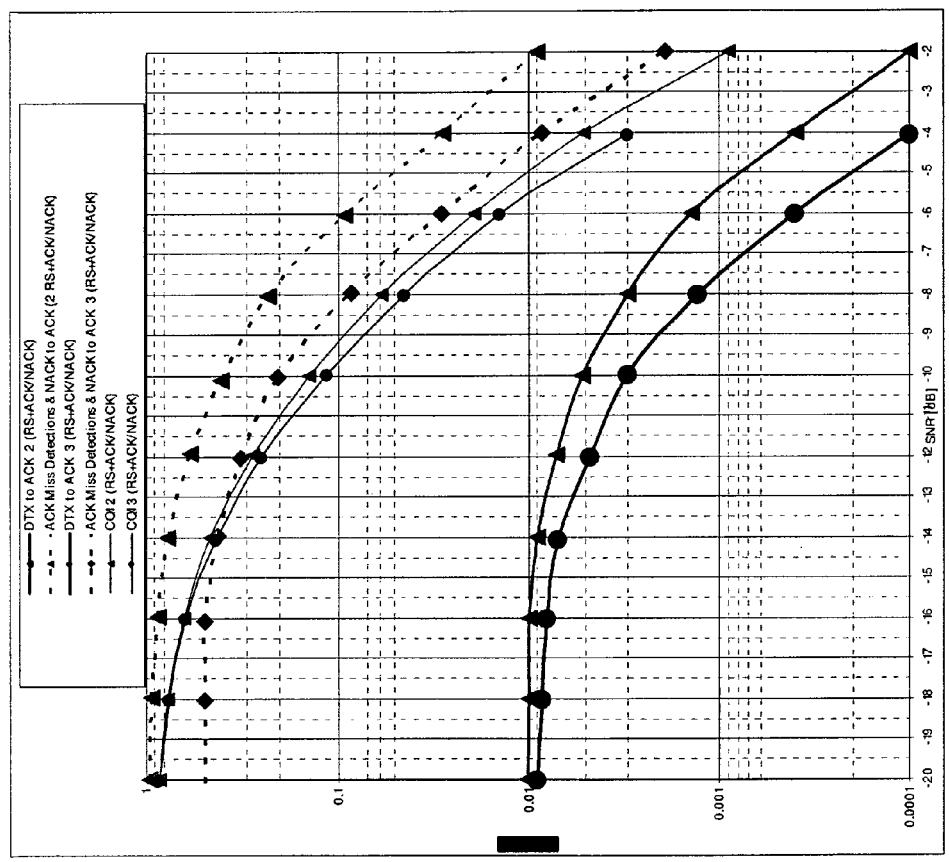
FIGS. 5A and 5B are diagrams of performance results for the processes of FIGS. 4A-4C, in accordance with various embodiments of the invention.
Figure 5B:
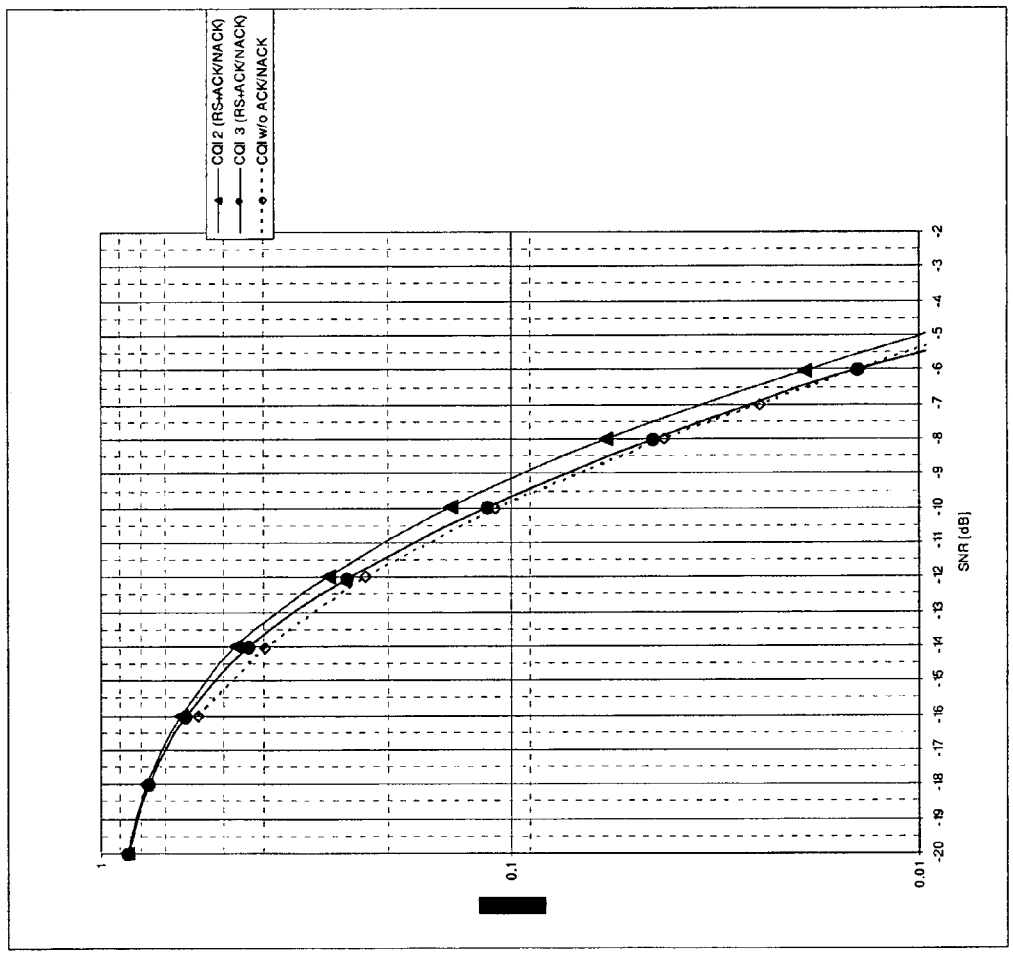
Figure 6:
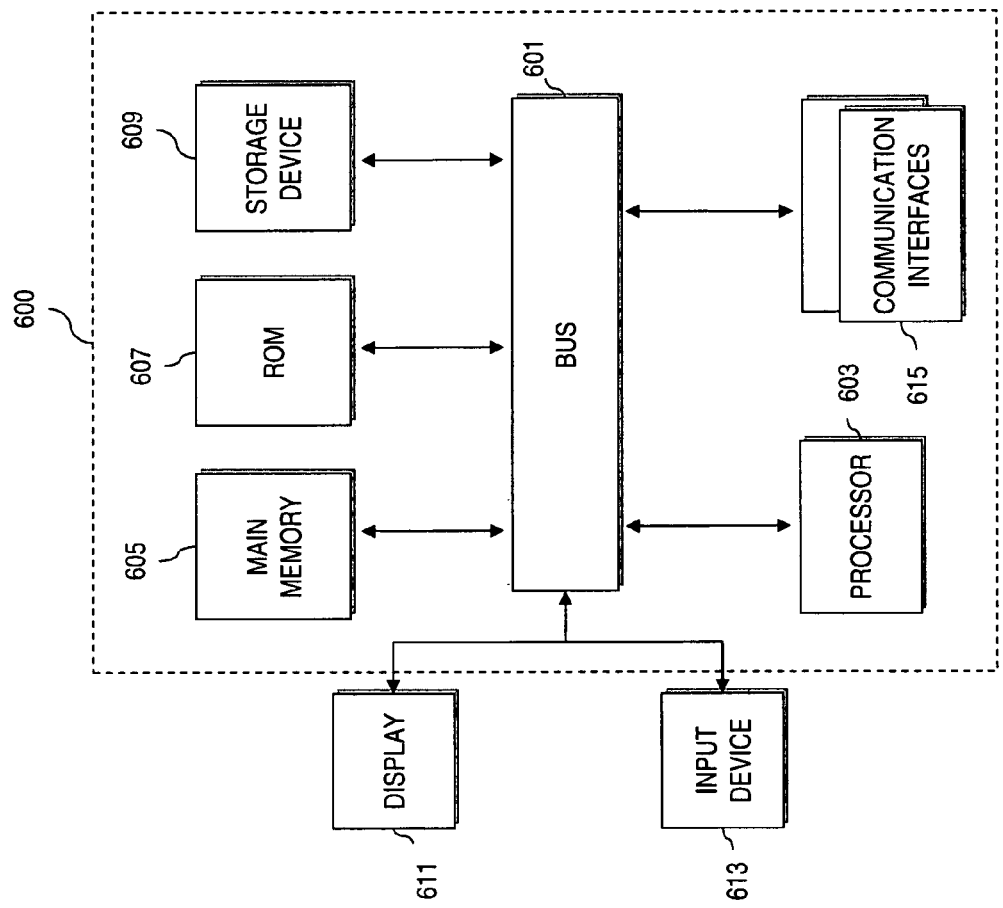
FIG. 6 is a diagram of hardware that can be used to implement an embodiment of the invention.

Tables 1 and 2 illustrate length 2 and 3 cover sequences utilized within simulations whose results are depicted in FIGS. 5 and 6. It should be noted that in addition to the cover sequences, cyclic shift separation can be used as well.

TABLE 1

|          | C1 | C2 |
|----------|----|----|
| NACK/DTX | 1  | 1  |
| ACK      | 1  | −1 |

TABLE 2

|          | C1 | C2         | C3         |
|----------|----|------------|------------|
| NACK/DTX | 1  | 1          | 1          |
| ACK      | 1  | $e^{j2pi/3}$ | $e^{j4pi/3}$ |

As shown in FIG. 4C, a receiving node (e.g., base station 103) multiplexes acknowledgement signaling bits and CQI bits, per steps 421-425. Thereafter, the cover sequences are correlated, per step 427.

When the UE 101 has a CQI or both ACK/NACK and CQI to be transmitted (but having no data to be transmitted in UL), the performance of joint RS and ACK/NACK sequence modulation are considered. The link performance can be analyzed as a function of joint RS and ACK/NACK sequence length. The signaling combination after multiplexing of ACK/NACK and CQI is transmitted on physical uplink control channel (PUCCH). According to one embodiment, 3 long blocks (LB) jointly allocated to RS and ACK/NACK is used when CQI transmitted with ACK/NACK on the PUCCH. In this example, it is provided that CQI and CQI+ACK/NACK is transmitted in the same way using joint RS and ACK/NACK sequences of 3 LB length. With this approach, multiplexing of CQI and ACK/NACK into same sub-frame is supported. In addition, signaling targets with reasonable signal-to-noise ratio (SNR) level can be achieved. In an exemplary case of a 5-bit CQI report, performance of joint ACL/NACK and CQI transmission equals to CQI only transmission; it is contemplated that any amount of bits can be designated for the CQI information (e.g., 4 bits). The Table 3 shows, for instance, exemplary targets for UL signaling.

TABLE 3

| Event                      | Target quality |
|----------------------------|----------------|
| ACK misdetection (for DL-SCH) | (1e−2)      |
| DTX to ACK error (for DL-SCH) | (1e−2)      |

TABLE 3-continued

| Event                      | Target quality   |
|----------------------------|------------------|
| NACK to ACK error (for DL-SCH) | (1e−4)       |
| CQI block error rate       | FFS (1e−2-1e−1)  |

FIGS. 5A and 5B are diagrams of performance results for the processes of FIGS. 4A-4C, in accordance with various embodiments of the invention. Table 4, below, summarizes the main parameters used in the link simulations. The results have been obtained assuming a practical receiver and realistic channel estimation algorithms. Slot-based frequency hopping and typical urban (TU) channel with UE 101 speed of 30 km/h were also assumed. In this example, the number of CQI bits is 5, and the number ACK/NACK bits is 1. The ACK/NACK bit is detected by a simple power detector. The DTX to ACK target of 1% is gained by means of proper threshold value.

TABLE 4

| Number of information bits | CQI: 5 bits<br>ACK/NACK: 1 bit |
|----------------------------|--------------------------------|
| Channel                    | TU (3 km/h)                    |
| Number of RS blocks        | 2, 3                           |
| Channel codes              | Block code                     |
| Receiver                   | MRC                            |
| Modulation                 | QPSK                           |
| System bandwidth           | 5 MHz                          |
| Number of UEs              | 6                              |
| Frequency hopping          | At slot boundary               |

Performance results for the 2 RS and 3 RS case are shown in FIG. 5A and summarized in Table 5. It is observed that the 3 RS case outperforms 2 RS case with all quality metrics. Regarding the DTX to ACK error and ACK misdetection probabilities, it is noted that 3 RS has about 2 dB lower SNR requirement. This is due to the fact that higher processing gain results in lower threshold value, and lower threshold improves the detection probability.

TABLE 5

| Event<br>RS + ACK/NACK sequence | SNR requirement to meet<br>target quality<br>given in Table 1 | |
|---------------------------------|----------|----------|
| length                          | 2 LB     | 3 LB     |
| ACK misdetection (1e−2)         | −2.2 dB  | −4.2 dB  |
| NACK to ACK error (1e−4)        | −2.1 dB  | −4.0 dB  |
| CQI block error rate (1e−2)     | −5.0 dB  | −5.5 dB  |

FIG. 5B compares the performance of CQI with and without ACK/NACK signaling. Because performance of joint ACK/NACK and CQI transmission equals to CQI only transmission, multiplexing of the CQI and ACK/NACK into same sub-frame would be desirable.

One of ordinary skill in the art would recognize that the processes for providing control signaling may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 6.

FIG. 6 illustrates exemplary hardware upon which various embodiments of the invention can be implemented. A computing system 600 includes a bus 601 or other communication mechanism for communicating information and a processor 603 coupled to the bus 601 for processing information. The computing system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computing system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computing system 600 may be coupled via the bus 601 to a display 611, such as a liquid crystal display, or active matrix display, for displaying information to a user. An input device 613, such as a keyboard including alphanumeric and other keys, may be coupled to the bus 601 for communicating information and command selections to the processor 603. The input device 613 can include a cursor control, such as a mouse, a trackball, or cursor direction keys, for communicating direction information and command selections to the processor 603 and for controlling cursor movement on the display 611.

According to various embodiments of the invention, the processes described herein can be provided by the computing system 600 in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 600 also includes at least one communication interface 615 coupled to bus 601. The communication interface 615 provides a two-way data communication coupling to a network link (not shown). The communication interface 615 sends and receives electrical, electromagnetic, or optical signals that carry digital data streams representing various types of information. Further, the communication interface 615 can include peripheral interface devices, such as a Universal Serial Bus (USB) interface, a PCMCIA (Personal Computer Memory Card International Association) interface, etc.

The processor 603 may execute the transmitted code while being received and/or store the code in the storage device 609, or other non-volatile storage for later execution. In this manner, the computing system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIGS. 7A-7D are diagrams of communication systems having exemplary long-term evolution (LTE) architectures, in which the system of FIG. 1 can operate, according to various exemplary embodiments of the invention. By way of example (shown in FIG. 7A), the base station 103 and the UE 101 can communicate in system 700 using any access scheme, such as Time Division Multiple Access (TDMA), Code Division Multiple Access (CDMA), Wideband Code Division Multiple Access (WCDMA), Orthogonal Frequency Division Multiple Access (OFDMA) or Single Carrier Frequency Division Multiple Access (FDMA) (SC-FDMA) or a combination of thereof. In an exemplary embodiment, both uplink and downlink can utilize WCDMA. In another exemplary embodiment, uplink utilizes SC-FDMA, while downlink utilizes OFDMA.

The MME (Mobile Management Entity)/Serving Gateways 701 are connected to the eNBs 103 in a full or partial mesh configuration using tunneling over a packet transport network (e.g., Internet Protocol (IP) network) 703. Exemplary functions of the MME/Serving GW 701 include distribution of paging messages to the eNBs 103, termination of U-plane packets for paging reasons, and switching of U-plane for support of UE mobility. Since the GWs 701 serve as a gateway to external networks, e.g., the Internet or private networks 703, the GWs 701 include an Access, Authorization and Accounting system (AAA) 705 to securely determine the identity and privileges of a user and to track each user's activities. Namely, the MME Serving Gateway 701 is the key control-node for the LTE access-network and is responsible for idle mode UE tracking and paging procedure including retransmissions. Also, the MME 701 is involved in the bearer activation/deactivation process and is responsible for selecting the SGW (Serving Gateway) for a UE at the initial attach and at time of intra-LTE handover involving Core Network (CN) node relocation.

A more detailed description of the LTE interface is provided in 3GPP TR 25.813, entitled "E-UTRA and E-UTRAN: Radio Interface Protocol Aspects," which is incorporated herein by reference in its entirety.

Figure 7A:
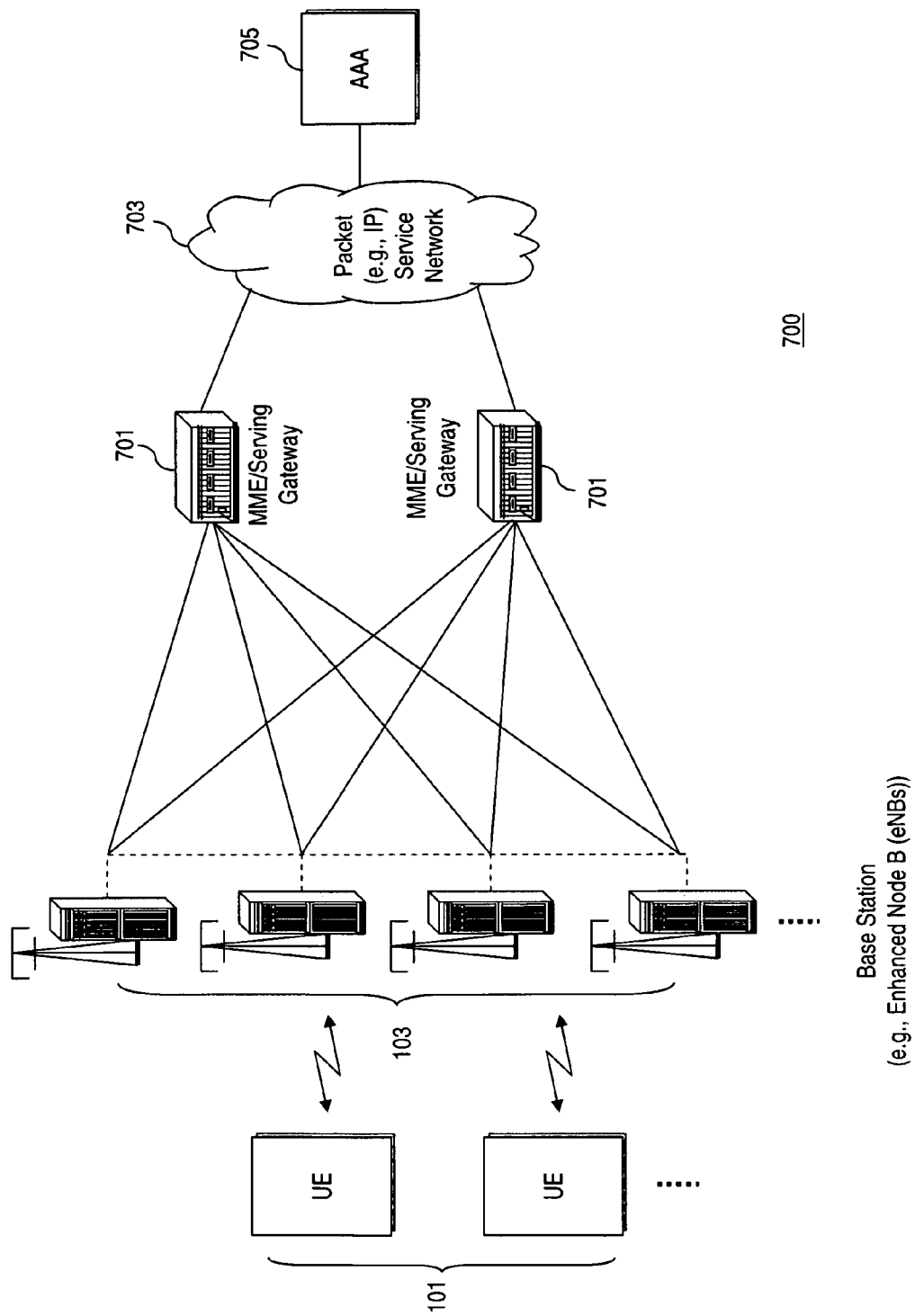
FIGS. 7A-7D are diagrams of communication systems having exemplary long-term evolution (LTE) and E-UTRA (Evolved Universal Terrestrial Radio Access) architectures, in which the system of FIG. 1 can operate, according to various exemplary embodiments of the invention.
Figure 7B:
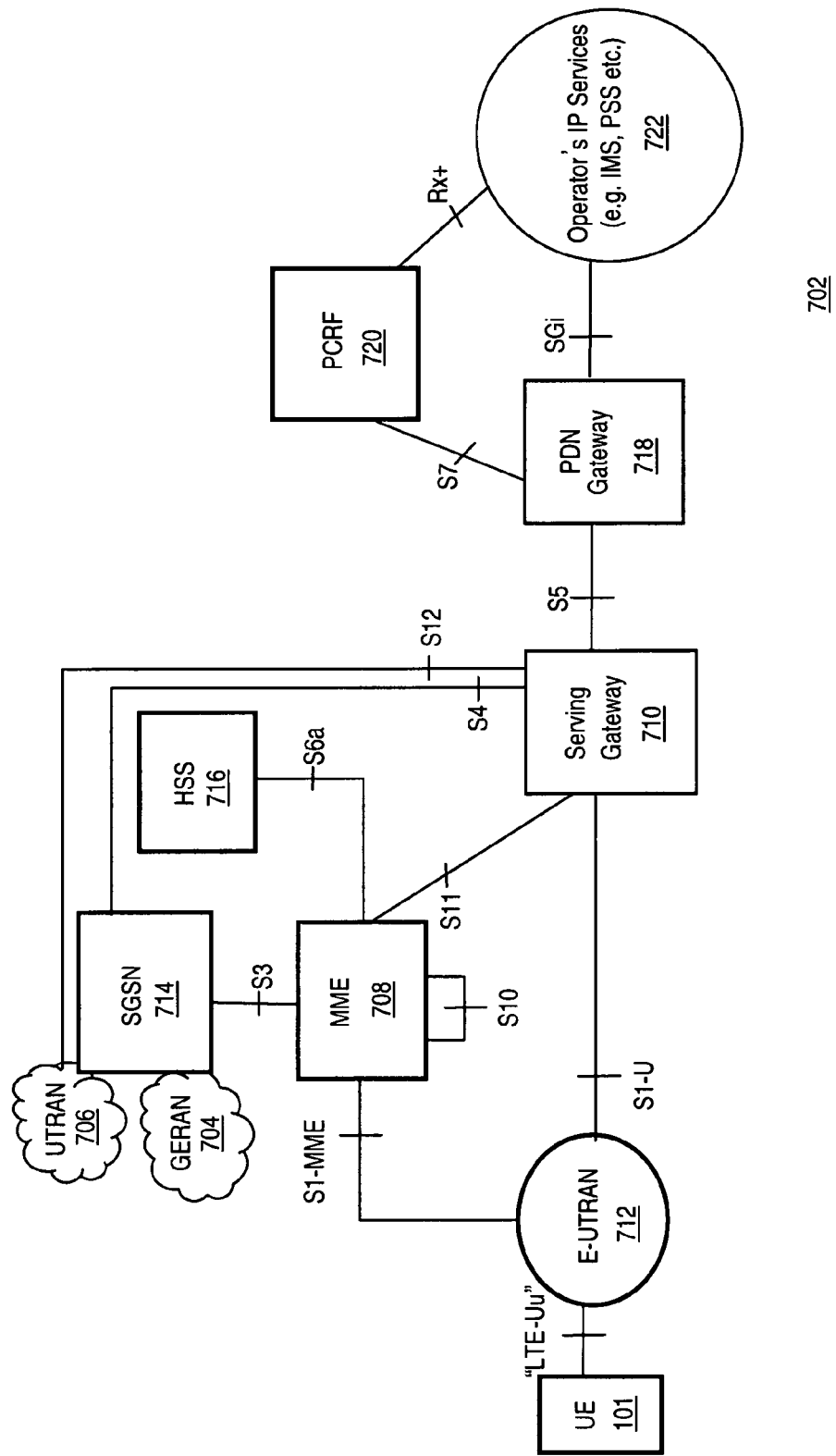

In FIG. 7B, a communication system 702 supports GERAN (GSM/EDGE radio access) 704, and UTRAN 706 based access networks, E-UTRAN 712 and non-3GPP (not shown) based access networks, and is more fully described in TR 23.882, which is incorporated herein by reference in its entirety. A key feature of this system is the separation of the network entity that performs control-plane functionality (MME 708) from the network entity that performs bearer-plane functionality (Serving Gateway 710) with a well defined open interface between them S11. Since E-UTRAN 712 provides higher bandwidths to enable new services as well as to improve existing ones, separation of MME 708 from Serving Gateway 710 implies that Serving Gateway 710 can be based on a platform optimized for signaling transactions. This scheme enables selection of more cost-effective platforms for, as well as independent scaling of, each of these two elements. Service providers can also select optimized topological locations of Serving Gateways 710 within the network independent of the locations of MMEs 708 in order to reduce optimized bandwidth latencies and avoid concentrated points of failure.

The basic architecture of the system 702 contains following network elements. As seen in FIG. 7B, the E-UTRAN (e.g., eNB) 712 interfaces with UE 101 via LTE-Uu. The E-UTRAN 712 supports LTE air interface and includes functions for radio resource control (RRC) functionality corresponding to the control plane MME 708. The E-UTRAN 712 also performs a variety of functions including radio resource management, admission control, scheduling, enforcement of negotiated uplink (UL) QoS (Quality of Service), cell information broadcast, ciphering/deciphering of user, compression/decompression of downlink and uplink user plane packet headers and Packet Data Convergence Protocol (PDCP).

The MME 708, as a key control node, is responsible for managing mobility UE identifies and security parameters and paging procedure including retransmissions. The MME 708 is involved in the bearer activation/deactivation process and is also responsible for choosing Serving Gateway 710 for the UE 101. MME 708 functions include Non Access Stratum (NAS) signaling and related security. MME 708 checks the authorization of the UE 101 to camp on the service provider's Public Land Mobile Network (PLMN) and enforces UE 101 roaming restrictions. The MME 708 also provides the control plane function for mobility between LTE and 2G/3G access networks with the S3 interface terminating at the MME 708 from the SGSN (Serving GPRS Support Node) 714.

The SGSN 714 is responsible for the delivery of data packets from and to the mobile stations within its geographical service area. Its tasks include packet routing and transfer, mobility management, logical link management, and authentication and charging functions. The S6a interface enables transfer of subscription and authentication data for authenticating/authorizing user access to the evolved system (AAA interface) between MME 708 and HSS (Home Subscriber Server) 716. The S10 interface between MMEs 708 provides MME relocation and MME 708 to MME 708 information transfer. The Serving Gateway 710 is the node that terminates the interface towards the E-UTRAN 712 via S1-U.

The S1-U interface provides a per bearer user plane tunneling between the E-UTRAN 712 and Serving Gateway 710. It contains support for path switching during handover between eNBs 103. The S4 interface provides the user plane with related control and mobility support between SGSN 714 and the 3GPP Anchor function of Serving Gateway 710.

The S12 is an interface between UTRAN 706 and Serving Gateway 710. Packet Data Network (PDN) Gateway 718 provides connectivity to the UE 101 to external packet data networks by being the point of exit and entry of traffic for the UE 101. The PDN Gateway 718 performs policy enforcement, packet filtering for each user, charging support, lawful interception and packet screening. Another role of the PDN Gateway 718 is to act as the anchor for mobility between 3GPP and non-3GPP technologies such as WiMax and 3GPP2 (CDMA 1x and EvDO (Evolution Data Only)).

The S7 interface provides transfer of QoS policy and charging rules from PCRF (Policy and Charging Role Function) 720 to Policy and Charging Enforcement Function (PCEF) in the PDN Gateway 718. The SGi interface is the interface between the PDN Gateway and the operator's IP services including packet data network 722. Packet data network 722 may be an operator external public or private packet data network or an intra operator packet data network, e.g., for provision of IMS (IP Multimedia Subsystem) services. Rx+ is the interface between the PCRF and the packet data network 722.

Figure 7C:
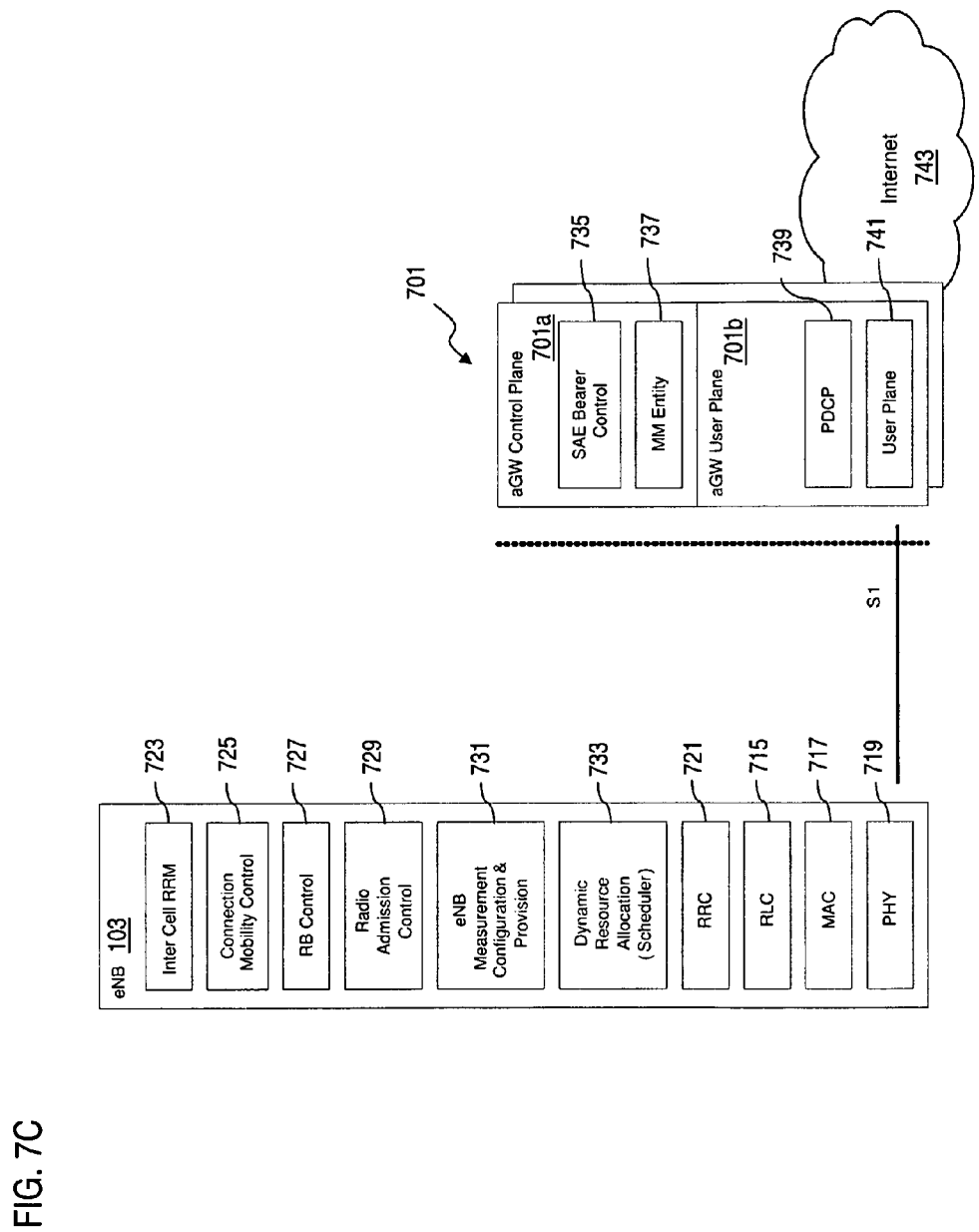

As seen in FIG. 7C, the eNB 103 utilizes an E-UTRA (Evolved Universal Terrestrial Radio Access) (user plane, e.g., RLC (Radio Link Control) 715, MAC (Media Access Control) 717, and PHY (Physical) 719, as well as a control plane (e.g., RRC 721)). The eNB 103 also includes the following functions: Inter Cell RRM (Radio Resource Management) 723, Connection Mobility Control 725, RB (Radio Bearer) Control 727, Radio Admission Control 729, eNB Measurement Configuration and Provision 731, and Dynamic Resource Allocation (Scheduler) 733.

The eNB 103 communicates with the aGW 701 (Access Gateway) via an S1 interface. The aGW 701 includes a User Plane 701a and a Control plane 701b. The control plane 701b provides the following components: SAE (System Architecture Evolution) Bearer Control 735 and MM (Mobile Management) Entity 737. The user plane 701b includes a PDCP (Packet Data Convergence Protocol) 739 and a user plane functions 741. It is noted that the functionality of the aGW 701 can also be provided by a combination of a serving gateway (SGW) and a packet data network (PDN) GW. The aGW 701 can also interface with a packet network, such as the Internet 743.

Figure 7D:
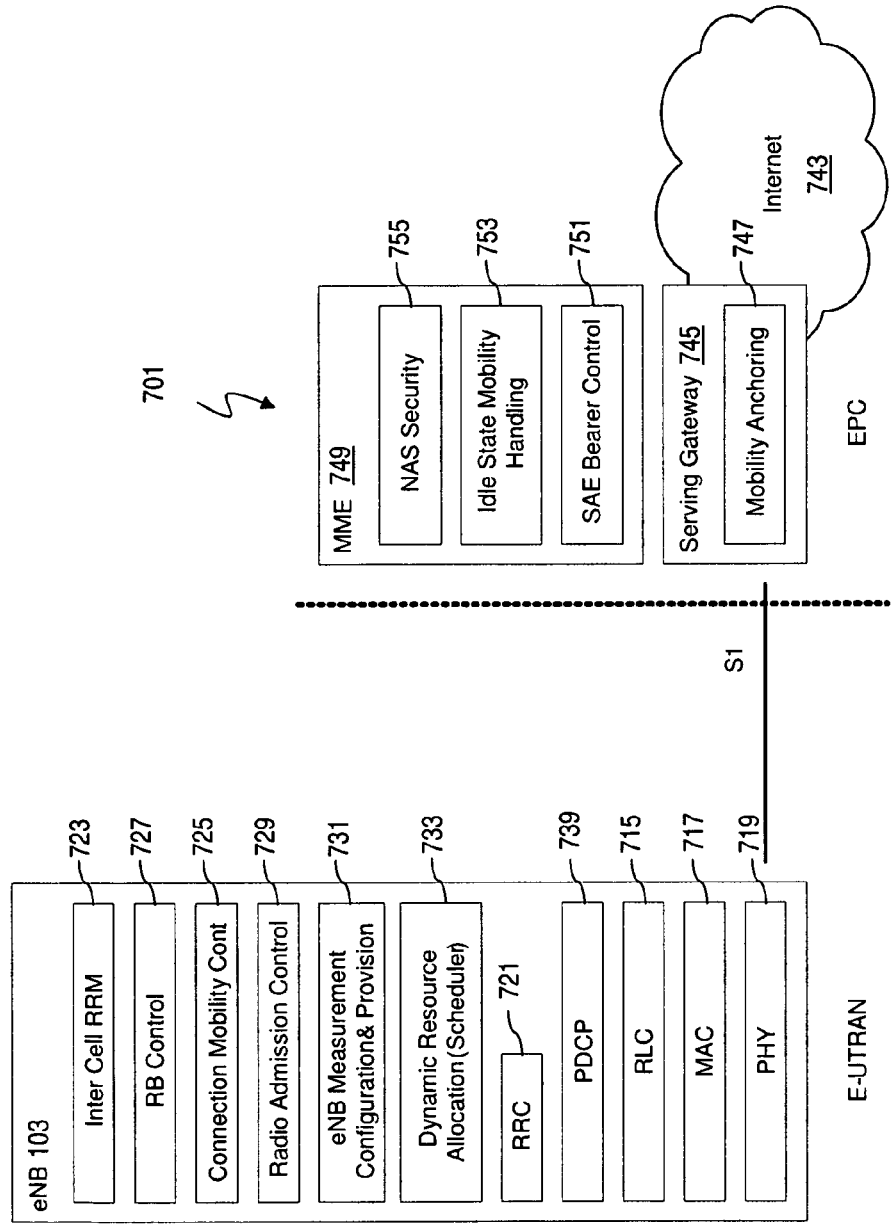

In an alternative embodiment, as shown in FIG. 7D, the PDCP (Packet Data Convergence Protocol) functionality can reside in the eNB 103 rather than the GW 701. Other than this PDCP capability, the eNB functions of FIG. 7C are also provided in this architecture.

In the system of FIG. 7D, a functional split between E-UTRAN and EPC (Evolved Packet Core) is provided. In this example, radio protocol architecture of E-UTRAN is provided for the user plane and the control plane. A more detailed description of the architecture is provided in 3GPP TS 36.300.

The eNB 103 interfaces via the S1 to the Serving Gateway 745, which includes a Mobility Anchoring function 747. According to this architecture, the MME (Mobility Management Entity) 749 provides SAE (System Architecture Evolution) Bearer Control 751, Idle State Mobility Handling 753, and NAS (Non-Access Stratum) Security 755.

Figure 8:
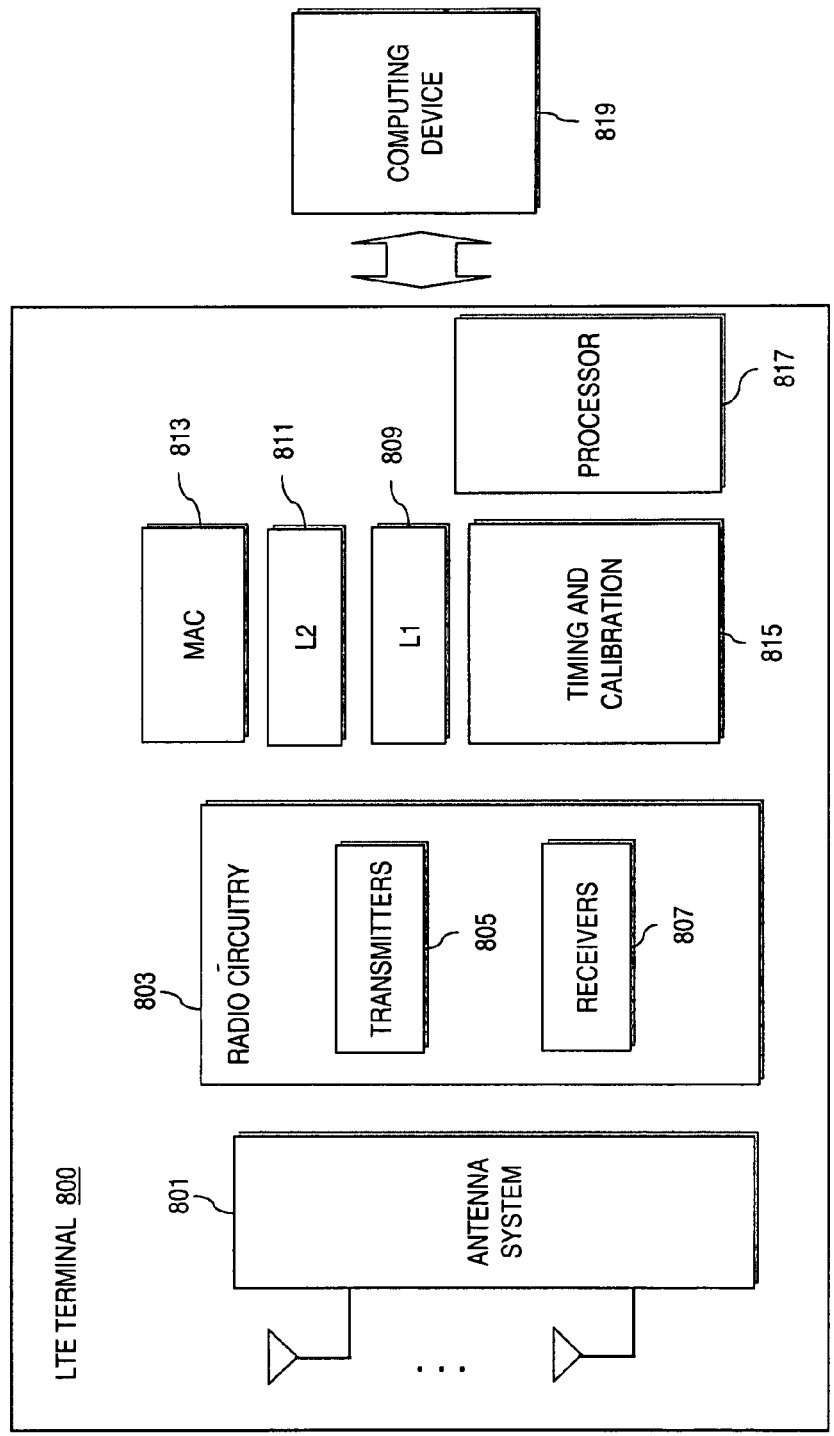
FIG. 8 is a diagram of exemplary components of an LTE terminal capable of operating in the systems of FIGS. 7A-7D, according to an embodiment of the invention.

FIG. 8 is a diagram of exemplary components of an LTE terminal capable of operating in the systems of FIGS. 7A-7D, according to an embodiment of the invention. An LTE terminal 800 is configured to operate in a Multiple Input Multiple Output (MIMO) system. Consequently, an antenna system 801 provides for multiple antennas to receive and transmit signals. The antenna system 801 is coupled to radio circuitry 803, which includes multiple transmitters 805 and receivers 807. The radio circuitry encompasses all of the Radio Frequency (RF) circuitry as well as base-band processing circuitry. As shown, layer-1 (L1) and layer-2 (L2) processing are provided by units 809 and 811, respectively. Optionally, layer-3 functions can be provided (not shown). Module 813 executes all MAC layer functions. A timing and calibration module 815 maintains proper timing by interfacing, for example, an external timing reference (not shown). Additionally, a processor 817 is included. Under this scenario, the LTE terminal 800 communicates with a computing device 819, which can be a personal computer, work station, a PDA, web appliance, cellular phone, etc.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining whether data has been properly received according to an error control scheme; encoding a pilot sequence by a first cover sequence if the data is properly received; encoding the pilot sequence by a second cover sequence if the data is not properly received; and multiplexing the encoded pilot sequences with channel quality indicator bits into a common sub-frame, wherein a length of at least the first and second cover sequences is equal to two when there are two pilot transport blocks in one time slot and three when there are three pilot transport blocks in one time slot.

2. A method according to claim 1, wherein the first cover sequence is represented by an X-OR operation of ones, and the second cover sequence is represented by an X-OR operation of alternating ones and zeros.

3. A method according to claim 1, wherein the pilot sequence comprises a ZAC (Zero Automatic Correlation) or CAZAC (Constant Amplitude and Zero Automatic Correlation) based pilot sequence.

4. A method according to claim 1, further comprising:
   performing cyclic shift separation between multiple pilot sequences sharing the same frequency and time resource.

5. An apparatus comprising:
   an error control logic configured to determine whether data has been properly received according to an error control scheme; an encoder configured to encode a first pilot sequence by a first cover sequence if the data is properly received, and to encode the pilot sequence by a second cover sequence if the data is not properly received; and a multiplexer configured to multiplex the encoded pilot sequences with channel quality indicator bits into a common sub-frame, wherein a length of at least the first and second cover sequence is equal to two when there are two pilot transport blocks in one time slot and three when there are three pilot transport blocks in one time slot.

6. An apparatus according to claim 5, wherein the second cover sequence is shared by a discontinuous transmission state.

7. An apparatus according to claim 5, wherein the first cover sequence is represented by an X-OR operation of ones, and the second cover sequence is represented by an X-OR operation of alternating ones and zeros.

8. An apparatus according to claim 5, wherein the pilot sequence comprises a ZAC (Zero Automatic Correlation) or CAZAC (Constant Amplitude and Zero Automatic Correlation) based pilot sequence.

9. An apparatus according to claim 5, wherein the sub-frame is transmitted over an uplink of a network, wherein the network is compliant with a Long Term Evolution architecture.

10. An apparatus according to claim 5, wherein the channel quality indicator bits correspond to an uplink of a network channel.

11. An apparatus according to claim 5, wherein a cyclic shift separation is performed between multiple pilot sequences sharing the same frequency and time resource.

12. A method comprising:
    determining a first cover sequence and a second cover sequence; and correlating a received sub-frame with at least one of the first cover sequence and the second cover sequence to determine presence of, respectively, an acknowledgement message or a negative acknowledgement message, wherein the received sub-frame specifies acknowledgement signaling for transmitted data according to an error control scheme and the received sub-frame further specifies channel quality indicator bits, wherein a length of at least the first and second cover sequence is equal to two when there are two pilot transport blocks in one time slot and three when there are three pilot transport blocks in one time slot.

13. An apparatus comprising:
    a processor configured to determine a first cover sequence and a second cover sequence; and a channel estimator configured to correlate a received sub-frame with at least one of the first cover sequence and the second cover sequence to determine presence of, respectively, an acknowledgement message or a negative acknowledgement message, wherein the received sub-frame specifies acknowledgement signaling for transmitted data according to an error control scheme and the received sub-frame further specifies channel quality indicator bits, wherein a length of at least the first and second cover sequence is equal to two when there are two pilot transport blocks in one time slot and three when there are three pilot transport blocks in one time slot.

14. An apparatus according to claim 13, wherein the received sub-frame comprises a ZAC (Zero Automatic Correlation) or CAZAC (Constant Amplitude and Zero Automatic Correlation) based pilot sequence.

15. A non-transitory computer-readable medium bearing computer program code embodied therein for use with a computer, the computer program code comprising: code for determining whether data has been properly received according to an error control scheme; code for encoding a pilot sequence by a first cover sequence if the data is properly received and encoding the pilot sequence by a second cover sequence if the data is not properly received; and code for multiplexing the encoded pilot sequence with channel quality indicator bits into a common sub-frame, wherein a length of at least the first and second cover sequences is equal to two when there are two pilot transport blocks in one time slot and three when there are three pilot transport blocks in one time slot.

* * * * *